United States Patent
Angot et al.

(10) Patent No.: US 7,905,559 B2
(45) Date of Patent: Mar. 15, 2011

(54) ISOLATED CENTER TREAD RIM IDLER WHEEL

(75) Inventors: Daniel Angot, Peoria, IL (US); Xiangyang Jiang, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 98 days.

(21) Appl. No.: 12/314,417

(22) Filed: Dec. 10, 2008

(65) Prior Publication Data
US 2010/0141026 A1    Jun. 10, 2010

(51) Int. Cl.
*B62D 55/08* (2006.01)
(52) U.S. Cl. ............................ 305/199; 305/137
(58) Field of Classification Search ............ 305/136, 305/137, 199; 295/7, 11; 152/47, 48, 49, 152/50
See application file for complete search history.

(56) References Cited

U.S. PATENT DOCUMENTS

| | | | | |
|---|---|---|---|---|
| 28,512 A | * | 5/1860 | Smith | 295/11 |
| 373,213 A | * | 11/1887 | Woodbury | 295/11 |
| 0,425,734 A | | 4/1890 | Birch | |
| 472,856 A | * | 4/1892 | Carmont | 152/41 |
| 1,894,432 A | * | 1/1933 | Watson | 254/327 |
| 2,463,226 A | * | 3/1949 | Walden | 152/47 |
| 2,911,252 A | | 11/1959 | Templeton | |
| 2,923,570 A | | 2/1960 | Jorn et al. | |
| 3,127,211 A | | 3/1964 | Kordes et al. | |
| 3,689,122 A | * | 9/1972 | Mazzarins | 305/136 |
| 3,797,895 A | * | 3/1974 | Tomizawa | 305/136 |
| 3,937,528 A | * | 2/1976 | Clemens et al. | 305/199 |
| 4,068,698 A | | 1/1978 | Boggs | |
| 4,069,856 A | | 1/1978 | Sogge | |
| 4,278,303 A | | 7/1981 | Livesay | |
| 4,818,041 A | * | 4/1989 | Oertley | 305/137 |
| 4,998,783 A | * | 3/1991 | Erlenmaier et al. | 305/137 |
| 5,207,489 A | | 5/1993 | Miller | |
| 5,829,849 A | | 11/1998 | Lawson | |
| 6,012,784 A | | 1/2000 | Oertley | |
| 6,250,726 B1 | | 6/2001 | Burdick et al. | |
| 6,416,142 B1 | | 7/2002 | Oertley | |
| 6,631,961 B1 | | 10/2003 | Bedford et al. | |
| 6,652,043 B2 | | 11/2003 | Oertley | |
| 6,739,678 B2 | | 5/2004 | Moebs et al. | |

FOREIGN PATENT DOCUMENTS

JP    56138068 A   *   10/1981

* cited by examiner

*Primary Examiner* — Russell D Stormer
(74) *Attorney, Agent, or Firm* — Finnegan, Henderson, Farabow, Garrett & Dunner LLP

(57) ABSTRACT

An isolated center tread rim idler is disclosed. The isolated center tread rim idler includes an idler body, and a circular rim including a radially outer portion configured to engage track bushings of a track assembly. The circular rim also includes a radially inner portion of less width than the radially outer portion. The radially inner portion is configured to cooperate with an outer circumferential surface of the idler body. The circular rim includes a curved transition portion between the radially outer portion and the radially inner portion. A resilient ring engages the curved transition portion. A side plate is fastened to a side of the idler body, and the side plate includes a portion engaging the resilient ring.

24 Claims, 4 Drawing Sheets

ISOLATED CENTER TREAD RIM IDLER WHEEL

TECHNICAL FIELD

The present disclosure relates generally to an idler and, more particularly, to an isolated center tread rim idler.

BACKGROUND

Earthmoving equipment and construction machines such as, for example, hydraulic excavators and track-type tractors, are used to perform a variety of tasks, typically in rugged environments. In order to enable machine movement, one or more track mechanisms may be provided on such machines. Conventional track mechanisms may include a drive sprocket and one or more idlers to support and enable movement of a ground engaging track about the drive sprocket and idler(s). A track idler may rotate about an axis, and may include a rim portion that engages a plurality of track link members that are interconnected by spaced track pins. Some idlers, for example center tread idlers, engage bushings extending between the laterally spaced links of a track mechanism. The drive sprocket, in combination with the engagement between the idler rim and the track bushing, provides the force that moves the machine. However, contact between the idler rim and the track bushings generate noise and vibrations that are detrimental to both the machine and its operator.

To help dampen the vibration and noise created by metal-on-metal contact in track assemblies and idler wheels, isolation devices, such as, for example, rubber inserts, have been used. U.S. Pat. No. 3,127,211 (the '211 patent) issued to Kordes et al. on Mar. 31, 1964, discloses a wheel assembly that employs an elastic member placed between a rim and a wheel body. In particular, the '211 patent describes a rail vehicle wheel with an elastically supported rim in which two annular elastic inserts may be provided between the wheel body and the rim.

Although the rail vehicle wheel of the '211 patent may provide some damping of vibration and noise by employing elastic inserts, the arrangement in the '211 patent may have limitations. For example, forces exerted by the rim on the elastic inserts may be so great as to repeatedly compress the elastic inserts beyond their elastic limit. This may lead to early failure of the elastic inserts. Also, the arrangement of the rim relative to the elastic inserts and the wheel body may cause the elastic inserts of the '211 patent to potentially experience both tension and compression and incur destructive shear forces under side loading. In addition, assembly of the wheel of the '211 patent may be problematic. The shape and relationship of components in the '211 patent may render it difficult to property seat both annular elastic inserts during assembly.

SUMMARY

In one aspect, the present disclosure is directed to an isolated center tread rim idler. The isolated center tread rim idler may include an idler body and a circular rim including a radially outer portion configured to engage track bushings of a track assembly. The circular rim may include a radially inner portion of less width than the radially outer portion, and the radially inner portion may be configured to cooperate with an outer circumferential surface of the idler body. The rim may include a curved transition portion between the radially outer portion and the radially inner portion, and a resilient ring may engage the curved transition portion. A side plate may be fastened to a side of the idler body, and the side plate may include a portion engaging the resilient ring.

In another aspect, the present disclosure is directed to a method of assembling an isolated center tread rim idler. The method may include mounting a first resilient ring on a portion of a first side plate, positioning an idler body adjacent the first side plate, and positioning a circular rim adjacent an outer circumferential surface of the idler body with a first transition portion of the rim in contact with the first resilient ring. The method may also include positioning a second resilient ring in contact with both the circular rim and a portion of a second side plate, and fastening the first and second side plates to the idler body.

DETAILED DESCRIPTION

Figure 1:
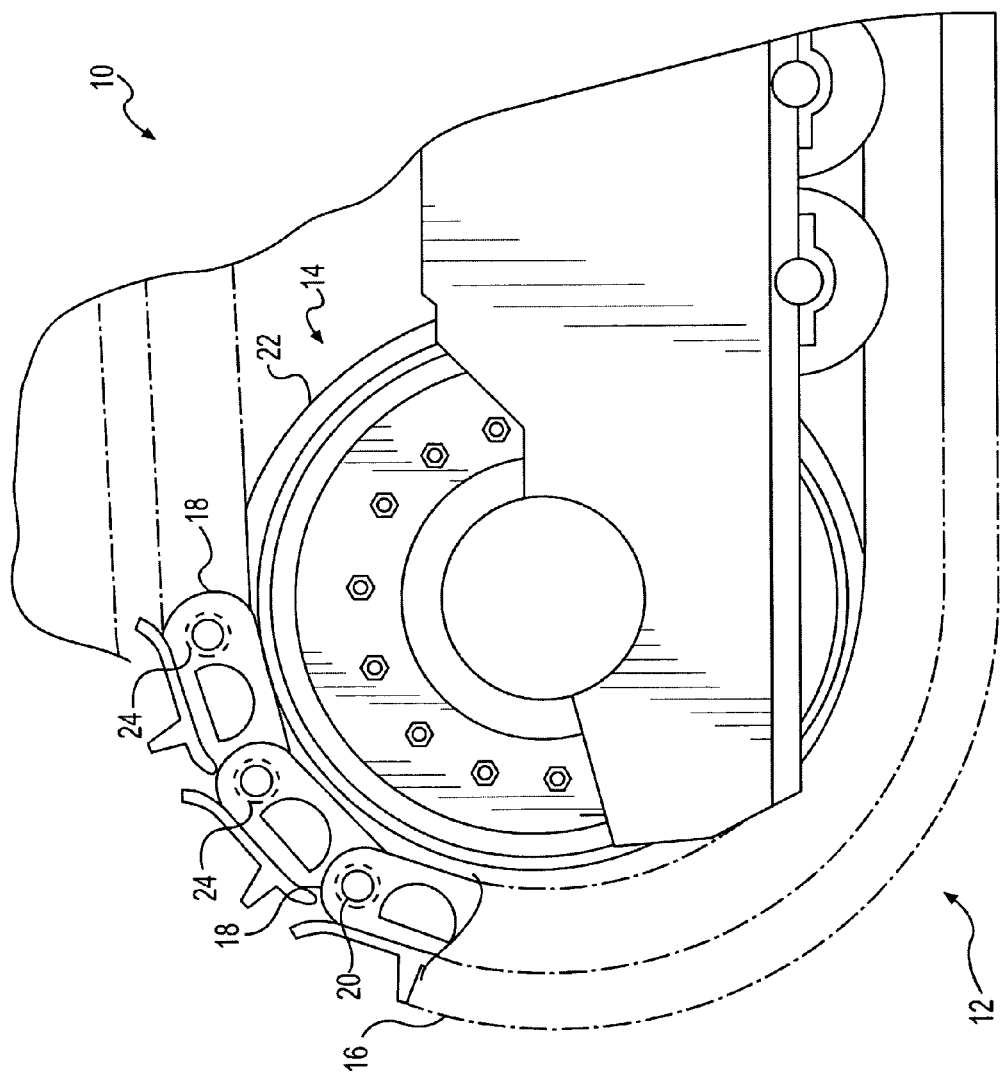
FIG. 1 illustrates a portion of a mobile machine having an idler wheel assembly according to a disclosed embodiment.

FIG. 1 is a partial view of a mobile machine 10, including a portion of a track assembly 12 associated with the mobile machine. Mobile machine 10 may be any of various mobile machines that employ track assemblies for ground transportation and/or for mobility during machine operation. For example, mobile machine 10 may be a track-type tractor, a tracked loader, a hydraulic excavator, or any other mobile machine. Track assembly 12 may include an idler assembly 14, cooperating with track 16 of track assembly 12. While only a portion of track assembly 12 is illustrated in FIG. 1, it will be understood that, in addition to idler assembly 14, a drive sprocket (not shown) and one or more other idler assemblies (also not shown), and other generally conventional track assembly components, may be associated with track assembly 12. Track 16 may include a plurality of links 18 connected by transverse track pins 20 and forming an endless loop about idler assembly 14, the drive sprocket (not shown), and any other idler assemblies that may be associated with the track assembly. Idler assembly 14 may include an outer peripheral surface 22 configured to engage track bushings 24 that may be associated with track pins 20.

Figure 2:
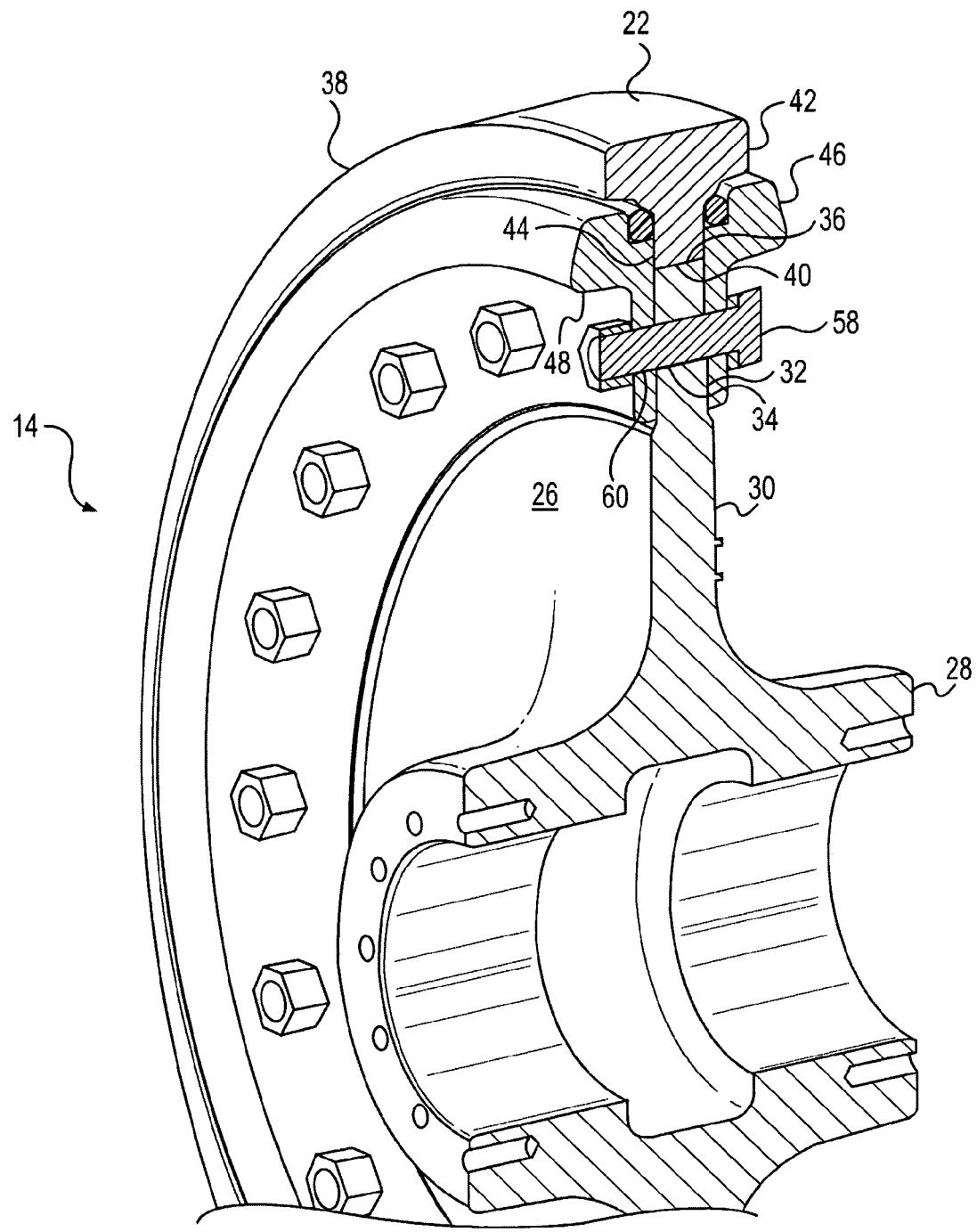
FIG. 2 is a partial cross-sectional view in perspective of an idler wheel assembly according to a disclosed embodiment.

FIG. 2 illustrates a perspective cut-away view of a portion of idler assembly 14. Idler assembly 14 may include a circular idler body 26, and idler body 26 may include a hub portion 28 configured to be positioned about an axle for rotation. In the embodiment illustrated in FIG. 2, idler body 26 may include an enlarged hub portion 28 integral with a central flange 30. A peripheral portion 32 of reduced thickness relative to central flange 30 may be included adjacent the outer circumference of idler body 26. Peripheral portion 32 may include a plurality of apertures 34 extending through its thickness. Idler body 26 may include an outer circumferential surface 36 at the outer diameter of the idler body. Idler body 26 may be a cast component made from a material of suitable strength and durability commensurate with the intended operating environment such as, for example, a suitable ferrous alloy material.

Idler assembly 14 also may include a circular rim 38. Circular rim 38 may be an annular member having an inner circumferential surface 40 at its inner diameter. As can be seen in the more detailed view in FIG. 3, the inner circumferential surface 40 may be spaced from the outer circumferential surface 36 of idler body 26 by a radial gap 41. As can be seen by reference to FIGS. 2 and 3, circular rim 38 may be T-shaped in cross-section, including a wider radially outer portion 42 and a radially inner portion 44 that is narrower than radially outer portion 42. For example, in one embodiment, radially outer portion 42 may be approximately three times the width of radially inner portion 44. Circular rim 38 may include a curved transition portion 43 on one side of circular rim 38 between radially outer portion 42 and radially inner portion 44, and a curved transition portion 45 on the other side of circular rim 38 between radially outer portion 42 and radially inner portion 44. Circular rim 38 may include the outer peripheral surface 22 at its outer diameter that is configured to engage track bushings 24 associated with track pins 20. Circular rim 38 may be a cast component, for example, made from a material of suitable strength and durability commensurate with the intended operating environment. For example, circular rim 38 may be a suitable ferrous alloy material.

Idler assembly 14 may include side plates 46, 48, positioned adjacent idler body 26 and circular rim 38. Side plates 46, 48 each may be annular members overlapping the radial gap 41 between circular rim 38 and idler body 26. Referring to first side plate 46, for example, it may include a wider projecting portion 50 and a narrower planar portion 52. Second side plate 48 may be similar to first side plate 46, and may include wider projecting portion 54 and narrower planar portion 56. Side plates 46, 48 may be fastened to opposite sides of idler flange 26 by suitable fasteners. For example, side plates 46, 48 may be bolted to peripheral portion 32 by a plurality of bolts 58 extending through apertures 60 in side plates 46, 48 and apertures 34 extending through the thickness of peripheral portion 32. Wider projecting portions 50, 54 of side plates 46, 48 may be spaced from lateral surfaces of radially inner portion 44 of circular rim 38 by lateral gaps 62 and 64.

Figure 3:
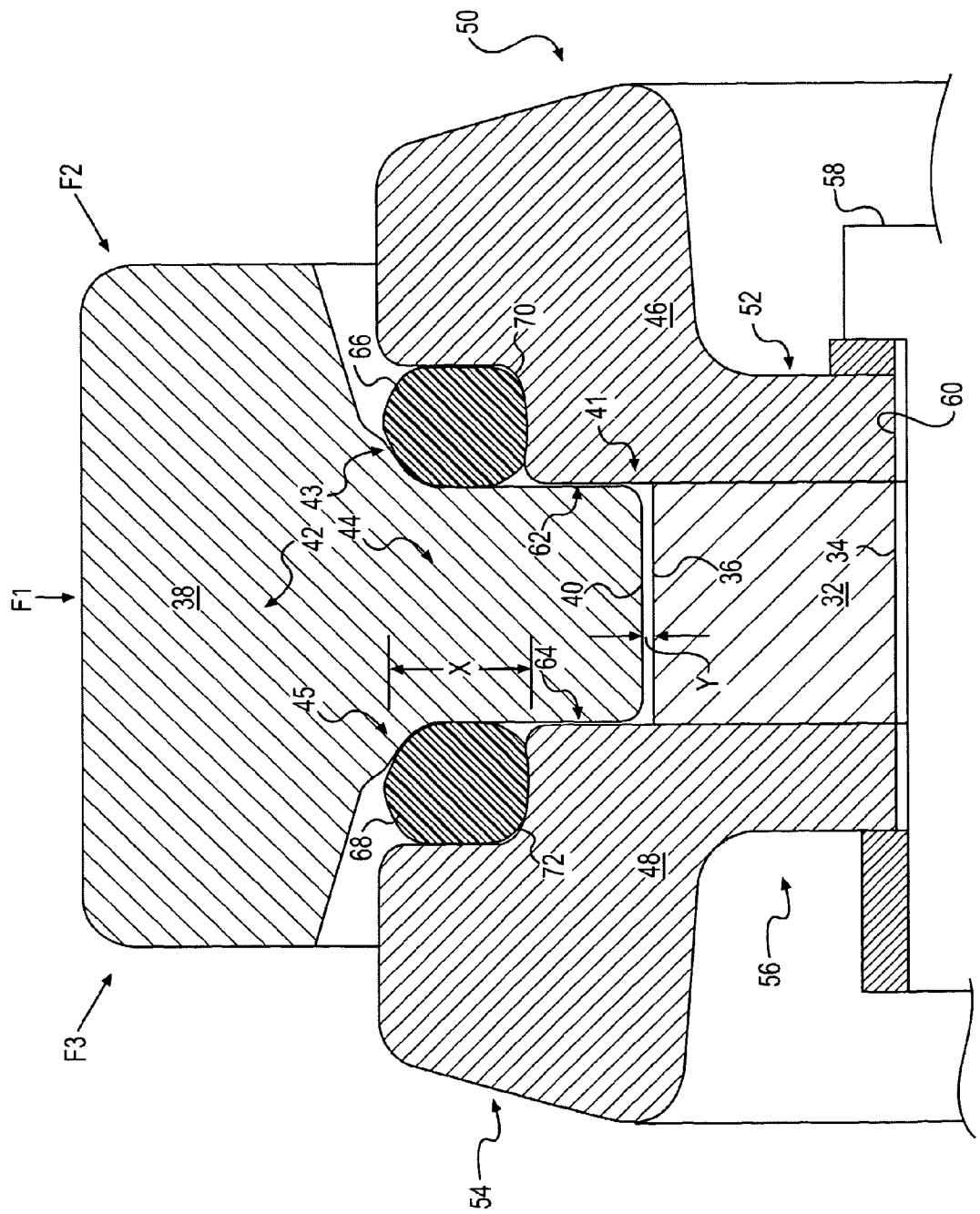
FIG. 3 illustrates a cross-sectional view of a portion of an idler wheel assembly according to a disclosed embodiment.

Annular resilient rings 66, 68 may be situated between circular rim 38 and side plates 46, 48. Referring to FIG. 3, for example, resilient ring 66 may engage curved transition portion 43 of circular rim 38, and may engage ledge portion 70 of side plate 46. Similarly, resilient ring 68 may engage curved transition portion 45 of circular rim 38, and may engage ledge portion 72 of side plate 48. Resilient rings 66, 68 may be O-rings, for example, having circular cross-sectional shapes. However, resilient rings 66, 68 may be of cross-sectional shape other than circular, such as oval, for example. As can be seen in FIG. 3, for example, resilient rings 66, 68 may be somewhat compressed in the assembled idler, exhibiting a cross-sectional shape different from that in an unassembled state. Resilient rings 66, 68 may include various resilient materials, such as, for example, natural rubber, neoprene rubber, butyl rubber, etc. The diameter and/or cross-sectional area of resilient rings 66, 68 may vary based on idler assembly parameters, expected forces to be encountered during machine operation, etc.

Referring to FIG. 3, for example, circular rim 38 may exert forces against resilient rings 66, 68 via curved transition portions 43, 45 during machine operation as track 16 moves about idler assembly 14. Such forces may compress resilient rings 66, 68 against ledge portions 70, 72 of side plates 46, 48. A distance x may exist between radially outer portion 42 of circular rim 38 and ledge portions 70, 72 of side plates 46, 48. This distance x may be substantially equivalent to a cross-sectional diameter of resilient rings 66, 68 in a normal engagement state of track 16 against idler assembly 14, and gap 41 may then be a distance y. The ratio x/y may be selected to permit a degree of compression of resilient rings 66, 68 responsive to external forces on track 16 without permitting contact between outer circumferential surface 36 of idler body 26 and inner circumferential surface 40 of circular rim 38 (i.e., without closing gap 41). As a result, external forces exerted on track 16 may be absorbed and/or attenuated by resilient rings 66, 68 without metal-on-metal contact between outer circumferential surface 40 of circular rim 38 and inner circumferential surface 36 of idler body 26. However, while selected to permit a certain degree of compression of resilient rings 66, 68, ratio x/y also may be selected to permit contact between inner circumferential surface 36 and outer circumferential surface 40 before resilient rings 66, 68 can be compressed to a degree that may exceed the elastic limit of the resilient material of resilient rings 66, 68.

Continuing to refer to FIG. 3, resilient rings 66, 68 may be so situated between curved transition portions 43, 45 of circular rim 38 and ledge portions 70, 72 of side plates 46, 48 as to reduce and/or substantially preclude shear forces on resilient rings 66, 68 even in the event of side loading on circular rim 38. While external forces on circular rim 38 may ordinarily tend to be exerted generally along the direction of arrow F1, external conditions, such as rugged terrain, may cause substantial side loading on circular rim 38, for example along the direction of arrow F2 or arrow F3. As can be seen in FIG. 3, a force along the direction of arrow F2 may tend to exert compression on resilient ring 68, and lateral gap 64 may close with contact between the lateral surface of radially inner portion 44 and side plate 48 before any substantial shear forces can be exerted on resilient ring 66. Similarly, a force along the direction of arrow F3 will tend to exert compression on resilient ring 66, and lateral gap 62 may close with contact between the lateral surface of radially inner portion 44 and side plate 46 before any substantial shear forces can be exerted on resilient ring 68. Lateral gaps 62, 64 may be so selected as to preclude compressive or shear forces on resilient rings 66, 68 that may exceed the elastic limit of the resilient material of the resilient rings.

Radial gap 41 (i.e., distance y) and lateral gaps 62, 64 may be selected based on the elastic properties of the resilient rings 66, 68, forces that may be expected on idler assembly 14 during machine operation, and idler and resilient ring sizes. For example, a typical radial gap 41 may be substantially within the range from 1-5 mm, for example 1.0 mm. A typical lateral gap 62, 64 may be substantially within the range from 0.5-2 mm, for example 0.5 mm. Typically, radial gap 41 will be greater than lateral gaps 62, 64, and distance x typically will be substantially larger than radial gap 41 (distance y). While the cross-sectional diameter of resilient rings 66, 68 may be substantially larger than radial gap 41, outer circumferential surface 36 and inner circumferential surface 40 may contact, closing radial gap 41 before compressive forces, for example exerted along the direction F1, can distort resilient rings 66, 68 beyond their elastic limit.

INDUSTRIAL APPLICABILITY

In general, an isolated center tread rim idler may be applicable to any mobile machine that is moved using a track mechanism with an idler. For example, in a track-type tractor or other tracked machine, a driven track may include one or more of the disclosed isolated center tread rim idlers to at least partially absorb the vibrations, shocks, and/or noise generated during machine movement over rough terrain. The presence of the resilient rings and the gaps may serve to prevent metal-to-metal contact between the circular rim and the idler body, and/or between circular rim and side plates. However, the gaps may be selected to ensure that metal-to-metal contact occurs before the resilient rings may be compressed an amount sufficient to exceed the elastic limit of the material within the resilient rings. The resilient rings may further serve to substantially seal the space between the circular rim and the side plates and preclude the entry of contaminants into the gaps.

The isolated center tread rim idler may be assembled on a suitable work surface, for example a fixture or jig sized and shaped to accommodate components of the idler. Initially, referring to step 101 in FIG. 4, and referring to FIGS. 2 and 3 to better visualize the various components of the idler assembly, a first resilient ring, for example an o-ring, may be mounted on a first side plate. For example, the first side plate may be placed on a work surface, or on a suitable jig, with a ledge portion of the first side plate readily accessible. The first resilient ring may be positioned on the ledge portion of the side plate. For example, the resilient ring may be stretched slightly and seated against the contoured surface of the ledge portion. Thus the resilient ring may be properly associated with the side plate and mounted on the ledge portion of the side plate with facility and without special tools.

Figure 4:
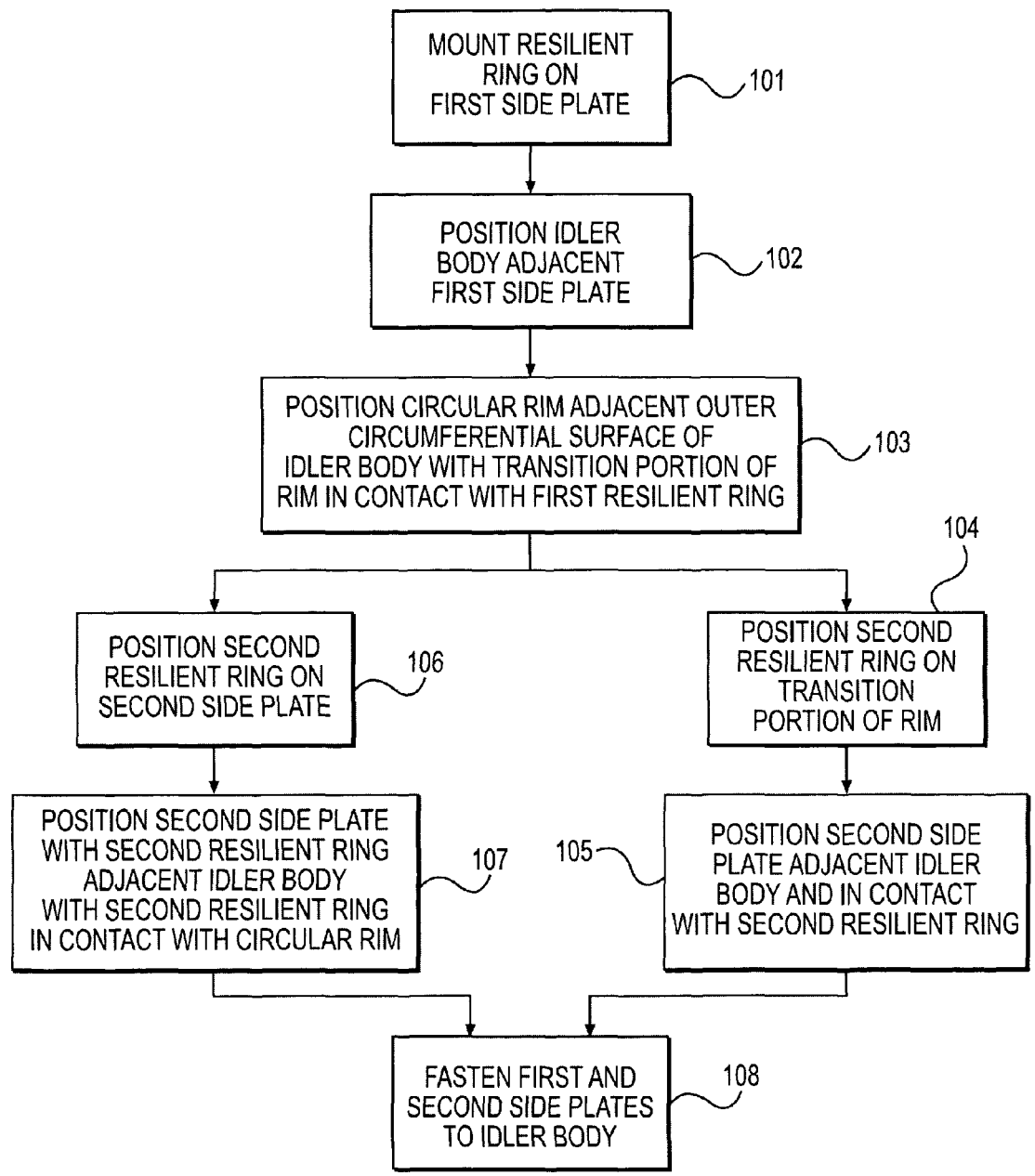
FIG. 4 is a diagrammatic illustration of a method of assembly of an idler wheel according to a disclosed embodiment.

After the first resilient ring is assembled on the first side plate, a circular idler body may be positioned adjacent the first side plate, referring to step 102 of FIG. 4. At this point it also may be convenient to place bolts within the respective apertures of the side plate and the idler body. For example, bolts may be positioned with their heads against the work surface, projecting through the side plate and the idler body. Alternatively, bolts may be inserted later in the assembly process.

Once the idler body is in place relative to the first side plate, and referring to step 103 in FIG. 4, a circular rim may be positioned adjacent the outer circumferential surface of idler body with a first curved transition portion of the circular rim in contact with the first resilient ring. The ring shape of circular rim has an internal diameter that is larger than the external diameter of the circular idler body in order to establish a gap (FIG. 3). Accordingly, positioning of the circular rim relative to the idler body may be accomplished with facility and without special tools. As the rim is positioned relative to the idler body, the first curved transition portion of rim may engage the first resilient ring.

With the circular rim in place relative to the idler body and the first resilient ring, a second resilient ring may be positioned relative to a second curved transition portion of the circular rim, step 104, and a second side plate may then be positioned adjacent the idler body and in contact with the second resilient ring, step 105. Alternatively, the second resilient ring may first be positioned on a second side plate, step 106, for example by slightly stretching the resilient ring and seating it against the contoured surface of a ledge portion of the second side plate. Where the second resilient ring is first positioned on the second side plate, the assembled second side plate and second resilient ring may then be positioned adjacent the idler body with the second resilient ring in contact with the second curved transition portion of the circular rim, step 107.

Once both resilient rings, the circular rim, and both side plates are positioned relative to the idler body, the first and second side plates may be fastened to the idler body, step 108. For example, the first and second side plates may be secured to the idler body by the plurality of bolts. Where the bolts have first been positioned relative to the first side plate and the idler body, positioning of the second side plate in step 105 or step 107 may include positioning the second side plate with its apertures aligned with and positioned over the extending threaded portion of the bolts. Final assembly of the idler wheel may be completed by placing nuts over the bolts. In final assembly, the resilient rings contact both the circular rim and the side plates with a degree of compression sufficient to substantially preclude entry of external contaminants into gaps in the idler assembly.

The T-shaped cross-section of the circular rim with its curved transition portions between the wider radially outer portion and narrower radially inner portion, and the ledge portions of side plates, combine to provide contoured surfaces that both facilitate assembly of the idler assembly and ensure that shear forces acting on the resilient rings are minimized. Assembly of the idler body, the circular rim, the side plates, and the resilient rings may be accomplished with a minimum of tools. For example, where the side plates are fastened to the idler body by a plurality of bolts, it is possible that the only assembly tool may be an appropriate tool to secure the bolts, e.g., a wrench.

Employing resilient rings between the rim and the side plates secured to the idler body enables a reduction in the transmission of both sound and vibration between the rim and the idler body. The resilient rings combined with controlled radial and lateral gaps between the rim and the idler body prevent metal-on-metal contact between the rim and the idler body during normal machine operation. Because the resilient rings essentially receive only compressive forces, they are not subjected to destructive shear stresses. Since the gap between the rim and the idler body serve as control gaps set to limit compression of the resilient rings to less than that which would exceed their elastic limit, the rings may not be crushed and/or unduly distorted, and the life of the resilient rings may be extended. Additionally, the contact of the resilient rings with the curved transition portions and with the ledge portions of the side plates serves to provide a seal to substantially preclude entry of contaminants, e.g., dirt, grit, etc., that may fill the radial gap and/or lateral gaps.

What is claimed is:

1. An isolated center tread rim idler, comprising:
 an idler body;
 a circular rim including a radially outer portion configured to engage track bushings of a track assembly, and including a radially inner portion of less width than the radially outer portion, the radially inner portion including a substantially flat side surface, the radially inner portion configured to cooperate with an outer circumferential surface of the idler body, wherein the rim includes a curved transition portion between the radially outer portion and the radially inner portion;
 a resilient ring engaging the curved transition portion and contacting a first portion of the substantially flat side surface of the radially inner portion of the rim; and
 a side plate fastened to a side of the idler body, the side plate including a portion engaging the resilient ring and a portion laterally adjacent to a second portion of the substantially flat side surface of the radially inner portion of the rim.

2. The isolated center tread rim idler of claim 1, wherein the resilient ring is an O-ring with a circular cross-section.

3. The isolated center tread rim idler of claim 1, wherein the circular rim is T-shaped in cross-section.

4. The isolated center tread rim idler of claim 1, wherein:
 the side of the idler body is one of two opposite sides of the idler body, and
 the side plate is one of two side plates, fastened to respective surfaces of the opposite sides of the idler body, both side plates laterally overlap the radially inner portion of the rim, and a lateral gap is formed between the radially inner portion of the rim and each side plate.

5. The isolated center tread rim idler of claim 1, wherein the idler body includes a peripheral portion of reduced thickness relative a central flange of the idler body, and wherein the side plate is an annular member bolted to the peripheral portion.

6. The isolated center tread rim idler of claim 1, wherein the portion of the side plate engaging the resilient ring includes a ledge portion configured to receive the resilient ring.

7. The isolated center tread rim idler of claim 1, including a radial gap between the outer circumferential surface of the idler body and an inner circumferential surface of the rim, and wherein the radial gap is configured to limit compression of the resilient ring to less than that which would exceed its elastic limit.

8. The isolated center tread rim idler of claim 1, wherein the radially outer portion radially overlaps at least a portion of the side plate and at least a portion of the resilient ring.

9. The isolated center tread rim idler of claim 1, wherein at least a majority of the resilient ring is positioned between the side plate and the rim.

10. A method of assembling an isolated center tread rim idler, comprising:
    mounting a first resilient ring on a portion of a first side plate;
    positioning an idler body adjacent the first side plate;
    positioning a circular rim adjacent an outer circumferential surface of the idler body with a first transition portion of the rim in contact with the first resilient ring, the first transition portion being located between a radially inner portion of the circular rim and a radially outer portion of the circular rim, the radially inner portion including a first substantially flat side surface that includes a portion that is in contact with the first resilient ring and a portion laterally adjacent to the first side plate when the first transition portion is in contact with the first, resilient ring;
    positioning a second resilient ring in contact with both the circular rim and a portion of a second side plate, the radially inner portion of the circular rim further including a second substantially flat side surface that includes a portion that is in contact with the second resilient ring and a portion laterally adjacent to the second side plate when the second resilient ring is in contact with the circular rim and the portion of the second side plate; and
    fastening the first and second side plates to the idler body.

11. The method of claim 10, wherein positioning the second resilient ring in contact with both the circular rim and the portion of the second side plate includes:
    mounting the second resilient ring on a portion of the second side plate; and
    positioning the second side plate and the second resilient ring adjacent the idler body with the second resilient ring in contact with the circular rim.

12. The method of claim 10, wherein positioning the second resilient ring in contact with both the circular rim and the portion of the second side plate includes:
    positioning the second resilient ring on a second transition portion of the rim; and
    positioning the second side plate adjacent the idler body and in contact with the second resilient ring.

13. The method of claim 10, wherein fastening the first and second side plates to the idler body includes bolting the side plates to the idler body via a plurality of bolts extending through holes in the idler body and the side plates.

14. An isolated center tread rim idler, comprising:
    an idler body including opposite side surfaces and an outer circumferential surface;
    a circular rim adjacent the outer circumferential surface of the idler body and including a radially inner portion and an inner circumferential surface;
    first and second side plates fastened to the respective opposite side surfaces of the idler body and disposed laterally adjacent the radially inner portion of the circular rim;
    a first resilient ring located between the rim and a portion of the first side plate laterally overlapping the rim;
    a second resilient ring located between the rim and a portion of the second side plate laterally overlapping the rim; and
    a radial gap between the outer circumferential surface of the idler body and the inner circumferential surface of the rim, wherein the radial gap is configured to limit compression of each of the resilient rings to less than that which would exceed its elastic limit.

15. The isolated center tread rim idler of claim 14, wherein the radial gap is approximately a 1 mm distance between the outer circumferential surface of the idler body and the inner circumferential surface of the rim.

16. The isolated center tread rim idler of claim 14, wherein the rim includes a radially outer portion that is wider than the radially inner portion of the rim.

17. The isolated center tread rim idler of claim 14, including a lateral gap between each side plate and the radially inner portion of the rim, wherein each lateral gap is configured to limit compression of one of the resilient rings to less than that which would exceed its elastic limit.

18. The isolated center tread rim idler of claim 17, wherein each lateral gap is approximately a 0.5 mm distance between the radially inner portion of the rim and each side plate.

19. The isolated center tread rim idler of claim 14, wherein the idler body includes a central flange and a peripheral portion that includes the outer circumferential surface, and wherein the peripheral portion is of less thickness than the central flange.

20. The isolated center tread rim idler of claim 19, wherein the side plate fastened to each opposite side surface of the idler body is fastened to the peripheral portion of the idler body.

21. The isolated center tread rim idler of claim 19, wherein the side plates are fastened to each of the opposite side surfaces of the idler body by a plurality of bolts passing through apertures in the side plates and apertures in the peripheral portion of the idler body.

22. The isolated center tread rim idler of claim 14, wherein each side plate includes a ledge portion configured to facilitate mounting the resilient ring on the side plate.

23. The isolated center tread rim idler of claim 14, wherein the rim includes a radially outer portion that radially overlaps at least a portion of each of the first and second side plates and at least a portion of each of the first and second resilient rings.

24. The isolated center tread rim idler of claim 14, wherein the radially inner portion includes:
    a first substantially flat side surface that includes a portion that is in contact with the first resilient ring and a portion laterally adjacent to the first side plate; and
    a second substantially flat side surface that includes a portion that is in contact with the second resilient ring and a portion laterally adjacent to the second side plate.

* * * * *